June 18, 1968 P. E. HERRICK 3,389,280
EDDY CURRENT COUPLING
Filed March 23, 1966
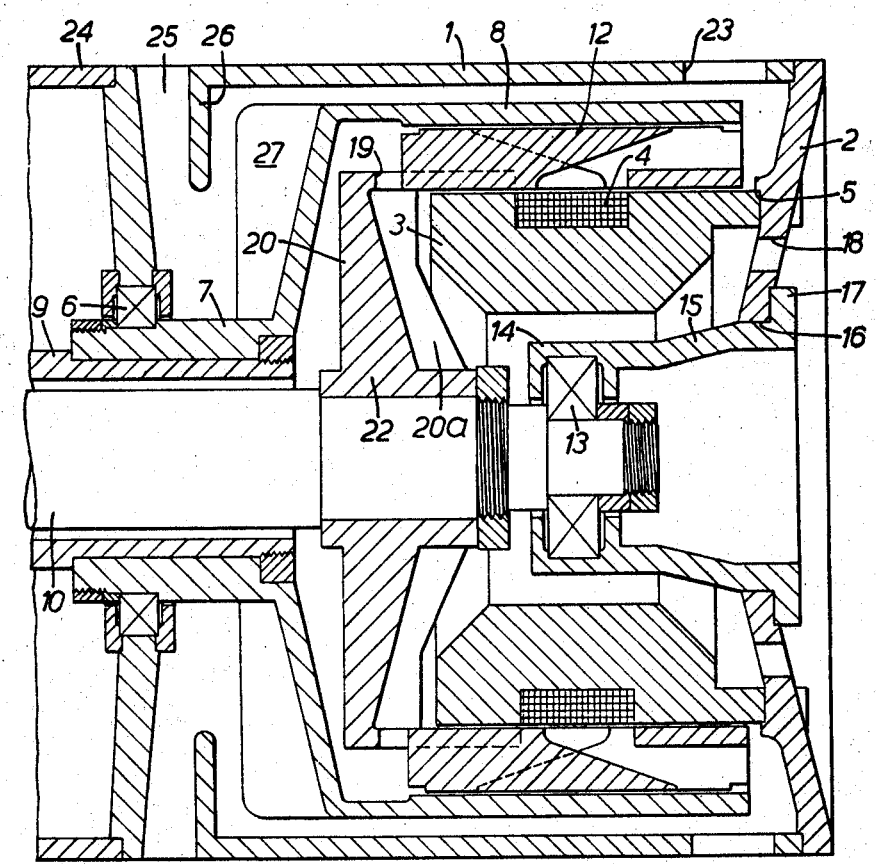
INVENTORS:
Philip E. Herrick
BY Kenneth M. Nicol
*Robert E. Howe*
ATTORNEY

United States Patent Office 3,389,280
Patented June 18, 1968

3,389,280
EDDY CURRENT COUPLING
Philip Elliott Herrick, Wotton-under-Edge, Gloucester, and Kenneth Martin Nicol, Amberley, Stroud, Gloucester, England, assignors, by mesne assignments, to, The Louis Allis Company, Milwaukee, Wis., a corporation of Delaware
Filed Mar. 23, 1966, Ser. No. 536,874
9 Claims. (Cl. 310—105)

ABSTRACT OF THE DISCLOSURE

An eddy current coupling is disclosed in which an output shaft is mounted coaxially with respect to a field coil. A nonmagnetic bearing support extends into a central cavity of the field coil for supporting a bearing housing. The housing encloses a bearing for supporting one end of the output shaft. The bearing support forms an air gap between the field coil and the housing to thermally and magnetically isolate the housing from the field coil.

This invention relates to eddy current couplings in which two rotatable members are disposed coaxially with respect to a fixed field structure. The field structure embodies an energising winding and the rotatable members are respectively connected to input and output shafts of the coupling.

Broadly the nivention provides an eddy current coupling comprising a field structure, a pair of rotatable members arranged coaxially with and surrounding said field structure, a quill arrangement of input and output shafts arranged one within the other and respectively associated with said rotatable members, a bearing supporting an inner end of an inner one of said shafts, a housing for said bearing, means defining an air gap separating said housing from said field structure by which to thermally isolate said housing from said field structure and said housing forming part of or being mounted on a nonmagnetic support structure by which to be magnetically isolated from said field structure.

The thermal and magnetic isolation of the bearing materially increases the life thereof, and the air gap between the bearing housing and the field structure is conveniently used for a flow of cooling air which thus cools both the field member and the bearing. The magnetic isolation prevents leakage of magnetic flux from the field structure through the bearing support and along the inner shaft which in prior constructions not only represents waste flux but has also resulted in the production of eddy currents in the bearing itself with attendant bearing wear.

Preferably, the bearing is located within the axial width of the field structure and a particularly advantageous construction results if the bearing is positioned at or close to the centre of the field structure. With such a construction the effect of an unbalanced magnetic pull on the rotatable members is minimised.

In an eddy current coupling the magnetic flux necessary to induce high values of eddy current, on which the torque is dependent, results in high flux density in the air gaps between the rotatable members themselves and between the inner rotatable member and the field structure. For efficient operation and material economy it is desirable that these air gaps are kept as short as possible. The resultant combination of high gap flux density and short gap produces conditions whereby any eccentricity between these magnetic ports due to normal manufacturing tolerances gives rise to a high unbalanced magnetic pull. The magnetic pull further increases the eccentricity due to deflection of the supporting structure and the shafts themselves, and the effects of the unbalanced pull are effectively minimised in the above described construction in which the bearing is mounted at the centre of the field structure.

Preferably, the bearing housing is formed at the inner end of a sleeve-like support bracket formed of non-magnetic material and passing through an end plate of the coupling to which it is bolted. With this arrangement the bearing is readily accessible for lubrication through the centre of the support bracket; the bracket and bearing can also readily be removed for servicing and replacement without disturbing the position of the field structure.

The invention will now be further described with reference to the accompanying drawing which illustrates, by way of example, an eddy current coupling in accordance with the invention. The drawing shows the coupling, somewhat diagrammatically, in axial section.

The coupling has an outer frame 1 to one end of which is fixed an end plate 2 which is slightly dished inwardly and to which is fixed a central hollow nonrotating field member 3. The field member 3 has the usual D.C. energising winding 4 and locates against an annular shoulder 5 on the end plate 2 for accurate centring within the frame 1.

The opposite end of the machine embodies a support bearing 6 in which is mounted a central boss 7 of a rotatable inductor drum 8 which is disposed coaxially around the field structure 3. The drum 8 is mounted and keyed on a hollow quill shaft 9 through which a solid inner shaft 10 passes with radial clearance. A rotatable pole assembly 12 of interdigitated form to provide alternating unwound magnetic poles of opposite polarity is disposed coaxially with and between the field structure 3 and the inductor drum 8. The pole assembly 12 is mounted on and keyed to the inner shaft 10, the inner end of the latter being supported in a bearing 13 disposed within the field structure 3 centrally of the latter.

The bearing 13 is mounted in a housing 14 formed at the inner end of a hollow sleeve-like support bracket 15 which passes through a central aperture 16 in the dished end plate 2 and has an outer end flange 17 by which it is bolted to that end plate. The support bracket 15 is of nonmagnetic material so that the bearing 13 can be said to be magnetically isolated from the field structure; as a result magnetic leakage is materially reduced. The support bracket 15 is spaced from the inner surface of the field structure 3 and the spacing is utilised for the passage of cooling air for the field structure which also acts to cool the bearing 13; thus the bearing can also be said to be thermally isolated from the field structure.

The cooling air enters the machine through air inlets such as 18 in the end plate 2 between the bearing support bracket 15 and the supported end of the field structure 3. The air passes through the field structure 3 and then out radially through apertures such as 19 in the pole assembly disposed between the interdigitated portion thereof and a flange section 20 connected to a mounting hub of that assembly, the flow being induced by impeller blades 20a formed on the inner side of that flange section. The air then passes between the pole assembly 12 and the inductor drum 8 and out through outlet apertures such as 23 in the frame 1.

A main flow of cooling air passes axially within the frame 1 between the latter and the inductor drum 8 before leaving through the outlet apertures 23. The main flow enters through ventilating inlets 25 at the end of the frame remote from the outlets 23, and immediately on the right-hand side of the inlets 25, as shown in the drawing, there is disposed a radially inwardly projecting wall 26 around which the flow has to pass. The main flow is induced by impeller blades 27 on the outside of the inductor drum.

The described coupling can conveniently form a unit construction with a driving motor having a casing 24, or be independently constructed for separate drive. In the former case which is illustrated the support bearing 6 for the inductor drum 8 and outer quill shaft 9 is conveniently provided as shown at the adjacent end of the driving motor, the quill and inner shafts 9 and 10 being sufficiently long to pass right through the driving motor to bearings (not shown) at the other end of the motor.

During operation of the coupling relative rotation of the inductor drum 8 and pole assembly 12 when the field structure 3 is energised generates torque-producing eddy currents. The positioning of the support bearing 13 for the inner shaft 10 centrally within the pole structure minimises deflection of that shaft due to any unbalanced magnetic pull acting on the pole assembly 12 and consequent deflection of the pole assembly itself with further increasing eccentricity and increased magnetic unbalance. The quill shaft 9 on which the inductor drum 8 is overhung is of a large diameter and consequently very stiff in the sense that it resists bending moments due to an unbalanced magnetic pull on the inductor drum.

Wtih unit construction of motor and coupling the hollow outer quill shaft 9 may also carry the rotor of the motor. If the coupling is constructed for separate construction the outer shaft may alternatively carry a drive pulley. The support bracket 15 for the inner shaft bearing 13 can easily be removed with the bearing 13 for inspection and replacement of the latter without disturbing the accurate centering of the field structure 3 within the pole assembly 12 and the inductor drum 8. The bearing 13 is also readily accessible for greasing through the open end of the support bracket 15.

We claim:

1. An eddy current coupling comprising a field structure, a pair of rotatable members arranged coaxially with and surrounding said field structure, a quill arrangement of input and output shafts arranged one within the other and respectively associated with said rotatable members, a bearing supporting an inner end of an inner one of said shafts, non-magnetic means including a housing for said bearing and defining an air gap separating said housing from said field structure to thermally and magnetically isolate said housing from said field structure.

2. The eddy current coupling set forth in claim 1, wherein said air gap between said bearing housing and said field structure is in use utilised for a flow of cooling air.

3. The eddy current coupling set forth in claim 2, wherein said bearing is located within the axial width of said field structure.

4. The eddy current coupling set forth in claim 3, wherein said bearing is positioned close to the centre of said field structure.

5. The eddy current coupling set forth in claim 4, including an end plate, said non-magnetic means including a sleeve-like support bracket formed of non-magnetic material passing through said end plate and means bolting said support bracket to said end plate, said bearing housing being formed at the inner end of said support bracket.

6. The eddy current coupling set forth in claim 5, including means separately locating said field structure on and bolting said field structure to said end plate so that said support bracket and said bearing can be removed for servicing and replacement without disturbing the location of said field structure.

7. The eddy current coupling set forth in claim 6, including a driving motor for the coupling, said driving motor and said coupling providing a unit construction.

8. The eddy current coupling set forth in claim 7, wherein the motor includes a rotor which is mounted on said outer quill shaft of the said coupling.

9. The eddy current coupling set forth in claim 6, including a drive pulley for said coupling which is mounted on said outer quill shaft.

References Cited
UNITED STATES PATENTS

| | | | |
|---|---|---|---|
| 2,605,313 | 7/1952 | Sadler | 310—96 |
| 3,020,427 | 2/1962 | Wheeler et al. | 310—105 |
| 3,056,895 | 10/1962 | Cohen et al. | 310—105 X |
| 3,167,674 | 1/1965 | Woodward | 310—105 |

ROBERT K. SCHAEFER, *Primary Examiner.*

H. O. JONES, *Assistant Examiner.*